US008508801B2

(12) United States Patent
Matusik et al.

(10) Patent No.: US 8,508,801 B2
(45) Date of Patent: Aug. 13, 2013

(54) USING REFLECTANCE PROPERTIES

(75) Inventors: Wojciech Matusik, Lexington, MA (US); Jinwei Gu, New York, NY (US)

(73) Assignee: Adobe Systems Incorporated, San Jose, CA (US)

( * ) Notice: Subject to any disclaimer, the term of this patent is extended or adjusted under 35 U.S.C. 154(b) by 1295 days.

(21) Appl. No.: 12/323,693

(22) Filed: Nov. 26, 2008

(65) Prior Publication Data

US 2010/0039671 A1 Feb. 18, 2010

Related U.S. Application Data

(60) Provisional application No. 61/189,292, filed on Aug. 15, 2008.

(51) Int. Cl.
*H04N 1/40* (2006.01)

(52) U.S. Cl.
USPC ........................................... 358/2.1; 358/500

(58) Field of Classification Search
USPC .................. 358/1.9, 2.1, 3.1–3.14, 400, 500, 358/406, 504, 3.28, 468, 1.18
See application file for complete search history.

(56) References Cited

U.S. PATENT DOCUMENTS

| | | | | |
|---|---|---|---|---|
| 4,803,496 A | * | 2/1989 | Kawakami et al. | 347/172 |
| 5,497,180 A | * | 3/1996 | Kawakami et al. | 347/131 |
| 5,966,507 A | * | 10/1999 | Lin | 358/1.9 |
| 6,109,720 A | * | 8/2000 | Gotoh et al. | 347/15 |

OTHER PUBLICATIONS

Wang et al.,"Image Quality Assessment: From Error Visibility to Structural Similarity." IEEE Transactions on Image Processing, vol. 13, No. 4, Apr. 2004. 13 pages.
Pellacini et al., "Toward a Psychophysically-Based Light Reflection Model for Image Synthesis." Program of Computer Graphics, Cornell University, 2000, 10 pages.
"E Ink Electronic Paper Displays" [online]. E Ink Corporation, 2007 [retrieved on Nov. 2, 2011]. Retrieved from the Internet: <URL: http://web.archive.org/web/20070731123921/http:/www.e-ink.com/>.
"Inkjet printer" [online]. Wikipedia, 2007 [retrieved on Nov. 2, 2011]. Retrieved from the Internet: <URL: http://web.archive.org/web/20070328212624/http:/en.wikipedia.org/wiki/Inkjet_printer>.

* cited by examiner

*Primary Examiner* — Thomas D Lee
*Assistant Examiner* — Stephen M Brinich
(74) *Attorney, Agent, or Firm* — Wolfe-SMBC

(57) ABSTRACT

A method includes applying at least one medium to a substrate with a printing device to form a symbol. The perceived reflectance properties of the symbol are provided by an amount of the at least one medium applied to the substrate.

31 Claims, 8 Drawing Sheets

USING REFLECTANCE PROPERTIES

CROSS REFERENCE TO RELATED APPLICATIONS

This U.S. patent application claims priority under 35 U.S.C. §119(e) to U.S. Provisional Application 61/189,292, filed on Aug. 15, 2008. The disclosures of this prior application is considered part of the disclosure of this application and is incorporated herein by reference in its entirety.

BACKGROUND

The present disclosure relates to using reflectance properties.

Current printing and display technologies primarily involve gray-scale or color images. However, real world appearance is a function of more than just color. For example, one feature currently missing in current printing technology is the capability to view and print materials with varying reflectance properties (also called a "material properties"). Reflectance properties represents how light rays reflect from surfaces. For example, when users design documents such as magazine covers, post cards, or product packaging, they might want some regions to be glossy or shiny, and other regions to be diffuse or matte.

SUMMARY

This specification describes using reflectance properties to enable creating, printing, viewing, and previewing documents with various reflectance properties, while maintaining full control of the glossiness levels. Reflectance properties can also be used in display devices, including passive displays.

In general, one aspect of the subject matter described in the specification can be embodied in a method that includes applying at least one medium to a substrate with a printing device to form a symbol. The perceived reflectance properties of the symbol are provided by an amount of the at least one medium applied to the substrate. Other implementations of this aspect include corresponding systems, apparatus, and computer program products.

These and other implementations can optionally include one or more of the following features. The medium may be applied to the substrate in a halftone pattern. The amount of the at least one medium may include a plurality of mediums having different reflectance properties. Two or more mediums with different reflectance properties may be linearly combined. The perceived reflectance properties of the symbol may be modified based at least in part on reflectance properties of the substrate. A computer may determine an optimal linear combination of at least two functions representing reflectance properties. A relative glossiness of the functions may be preserved. A relative glossiness of the functions may not be preserved. The computer may render a preview of the symbol, the preview reflecting variable lighting and viewing conditions. At least one medium may be applied to the substrate in a halftone pattern to approximate linear combinations of the reflectance properties of the at least one medium with reflectance properties of the substrate.

In general, one aspect of the subject matter described in the specification can be embodied in a method that includes reflecting light through a display that includes a first layer and a second layer. The first layer includes cells having different reflectance properties, and the second layer is configured to reflect light through the first layer in a controlled manner. Other implementations of this aspect include corresponding apparatus.

These and other implementations can optionally include one or more of the following features. The second layer may include voltage controlled cells that produce varying levels of brightness.

In general, one aspect of the subject matter described in the specification can be embodied in a method that includes reflecting light through a display including a first layer, a second layer, and a third layer. The first layer includes translucent cells having more than one reflectance property, the second layer includes cells of variable transparency, and the third layer includes opaque cells having more than one reflectance property. The transparency of the cells of the second layer is adjustable to allow light to pass through a portion of the second layer to reflect from cells of the third layer. Other implementations of this aspect include corresponding apparatus.

In general, one aspect of the subject matter described in the specification can be embodied in a method that includes executing instructions on a specific apparatus so that binary digital electronic signals representing a symbol are communicated to the specific apparatus. Instructions are executed on the specific apparatus so that the specific apparatus applies at least one medium to a substrate to form the symbol. Perceived reflectance properties of the symbol are provided by an amount of the at least one medium applied to the substrate.

These and other implementations can optionally include one or more of the following features. The third layer may be configured to reflect light from cells of the third layer through cells of the first and second layers to provide a reflectance property based on reflectance properties of the cells of the first and third layers.

Particular implementations of the subject matter described in this specification can be implemented to realize one or more of the following advantages. Documents may be created, previewed, and printed with various reflectance properties with full control of the glossiness levels. Reflectance properties can be used in a passive display to change the material properties.

The details of one or more implementations of the invention are set forth in the accompanying drawings and the description below. Other features, aspects, and advantages of the invention will become apparent from the description, the drawings, and the claims.

BRIEF DESCRIPTION OF THE DRAWINGS

FIG. 4 is an example of gamut mapping with the algorithm of FIG. 3a.

DETAILED DESCRIPTION

Figure 1:
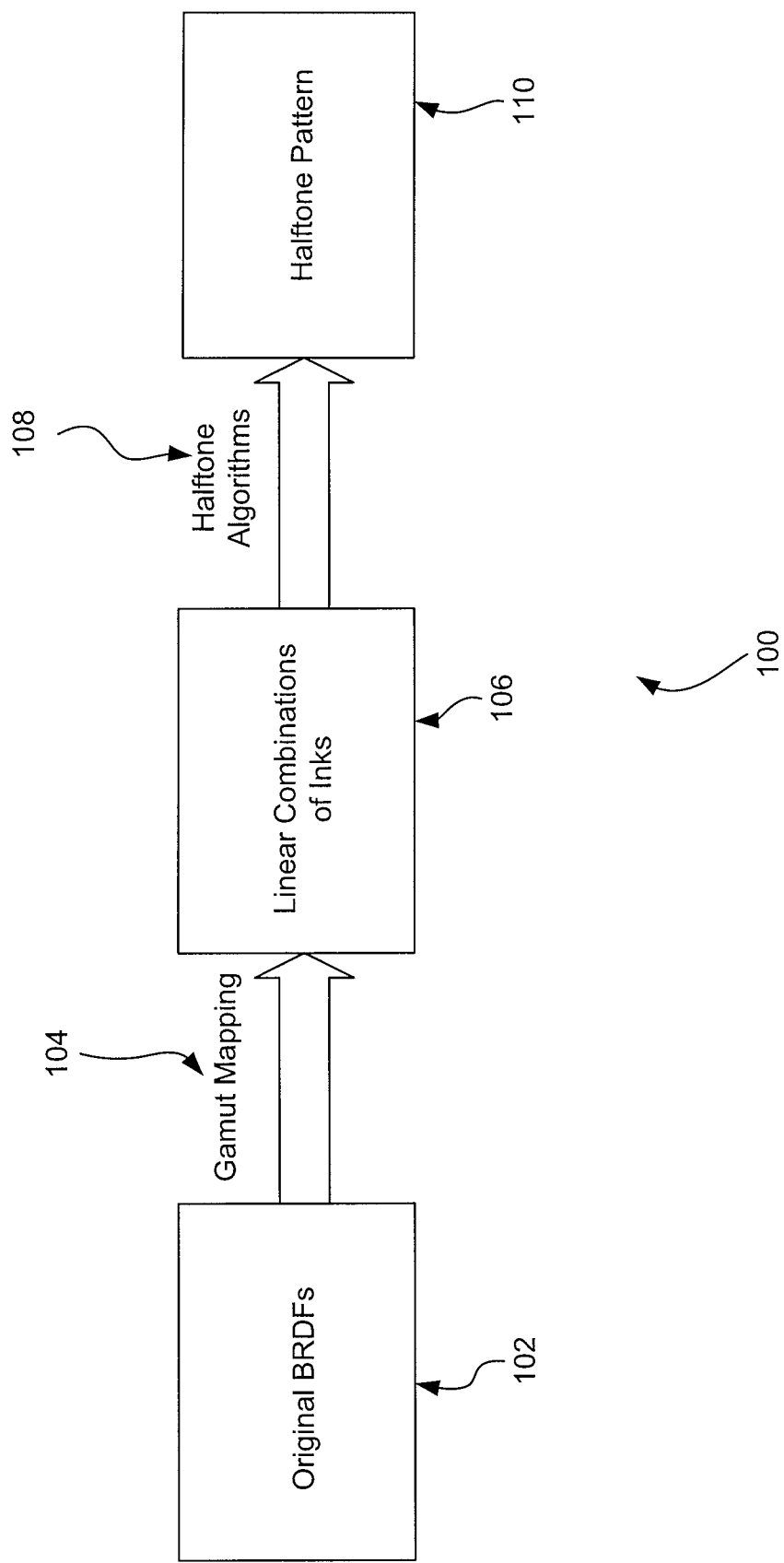
FIG. 1 is an exemplary two-step algorithm for printing BRDFs.

In the following detailed description, numerous specific details are set forth to provide a thorough understanding of claimed subject matter. However, it will be understood by those skilled in the art that claimed subject matter may be practiced without these specific details. In other instances, methods, apparatuses or systems that would be known by one of ordinary skill have not been described in detail so as not to obscure claimed subject matter.

Some portions of the detailed description which follow are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and generally, is considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

Many types of software and hardware exist for viewing and editing color images, and for printing and displaying color images. However, existing hardware and software is deficient in regard to creating, previewing, and printing documents with varying levels of glossiness. For example, photograph inkjet printers can print on glossy paper to create a "laminated" document; however, these printers can not produce a document that is glossy on one area, and diffuse on another area of the same document. Similarly, offset printing can print some regions of the substrate with metallic inks, but only with one level of glossiness. Furthermore, offset printing can not facilitate printing a region with some intermediate glossiness of the ink, and offset printing is expensive for common users. Similarly, neither photograph inkjet printers or offset printing can fully control the glossiness of a printed document.

In some examples, using reflectance properties in the manner described in the present disclosure enables printing with various reflectance properties with full control of the glossiness levels. Specifically, documents with spatially-varying reflectance properties can be created on a computer. Additionally, the system allows a user to preview the document at different lighting and viewing conditions, and may also enable the printer to actually manufacture such a document. In some examples, the printed document will be able to change its appearance at different lighting and viewing conditions, such as conditions designated by a user. Reflectance properties can be used in a passive display to change the material properties.

Reflectance properties can be characterized with a function called Bidirectional Reflectance Distribution Function (BRDF), which is a 4D function of the incoming light direction and the outgoing viewing direction. In some examples, a printing system can use inks with different BRDFs (e.g., inks with different amounts of glossiness such as metallic inks, glossy inks, matte inks, etc.) and linearly combine these inks to achieve the desired BRDFs.

Linearly combining ink BRDFs can be implemented in combination with a fundamental concept of current printing technologies: halftoning. Halftoning is a technique that can be used to achieve linear combinations of inks by printing ink dots at different frequencies or different sizes. The generated dot pattern is called "halftone pattern." For example, black-and-white printers might only have one ink while a color printer might normally have four inks (CMYK), but these printers can achieve almost continuous intensity levels or thousands of colors by using halftoning algorithms. The principle behind halftoning is that the human visual system tends to perceive the aggregated intensity and color of an image. Thus, as long as dots are printed in sufficiently high resolution, human observers cannot see dots artifacts. Instead, a human observer will perceive the aggregated intensities and colors as linear combinations of the inks.

Referring to FIG. 1, a two-step flowchart 100 is shown that represents operations to convert original BRDFs 102 to be printed to halftone pattern 110. Once converted, the halftone pattern 110 can be sent to inkjet printers to do the actual printing. A first operation involves gamut mapping 104. The input of this step is the original BRDFs 102 and the output is linear combinations of the inks 106 for each of the original BRDFs 102 (e.g., the weights of the linear combinations). A number of algorithms can be used in this process, and can be categorized into two categories: algorithms that do not preserve the relative glossiness between the original BRDFs, and algorithms that preserve the relative glossiness between the original BRDFs.

In algorithms that do not preserve the relative glossiness between the original BRDFs, the original BRDFs can be considered individually. For example, there might only be one BRDF to print, or there might be a wide gamut of inks. In these cases, the relative glossiness between the original BRDFs does not necessarily need to be preserved, and thus the best linear combination can be found for each of the original BRDFs individually. More specifically, as an example, the problem can be formulated as the following optimization problem:

$$\min \left\| f(\omega_1, \omega_0) - \sum_{k=1}^{K} \alpha_k f_k(\omega_1, \omega_0) \right\|$$

subject to:

$$\sum_{k=1}^{K} \alpha_k = 1, \text{ and}, 0 \le \alpha_k \le 1, k = 1, 2 \ldots, K$$

Where $f(\omega_1, \omega_0)$ is the original BRDF, $f_k(\omega_1, \omega_0)$, k=1, 2, ..., K are the BRDFs of the inks, and $\alpha_k$, k=1, 2, ..., K are the weights used to compute. The objective function, $\|\cdot\|$ can be a number of different objective functions, including: L-2 distance over the raw BRDF data; L-2 distance over the raw BRDF data, weighted by cosine of the incoming lighting direction; L-2 distance over the parameters of the BRDF after fitting the raw BRDF to the perceptually-based Ward model; L-2 distance over the image of the BRDF rendered under natural complex illumination; L-2 distance over the cubic root of the image of the BRDF rendered under natural complex illumination; and L-2 distance over the Structural Similarity Measure (SSIM) of the image of the BRDF rendered under natural complex illumination.

Figure 2A:
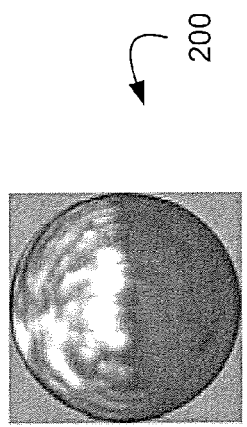
FIGS. 2a and 2b are examples of a linear combination of BRDFs.
Figure 2B:
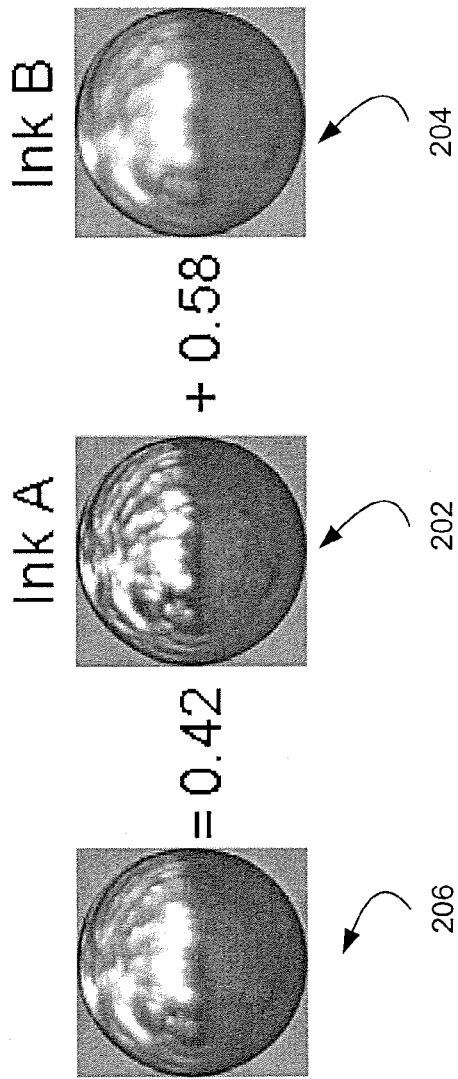

In some examples, the L-2 distance over the cubic root of the image of the BRDF rendered under natural complex illumination can be better than other objective functions in terms of being consistent with human perception of BRDF. FIG. 2 shows an example of a linear combination 206 of two BRDFs (202 and 204) as well as the original BRDF (200), where the weights are computed according to the cubic root objective function. The BRDFs are shown as rendered spheres under natural complex illumination.

When the range of BRDFs to be printed is larger than the range of BRDFs that can be obtained from the linear combinations of the inks, algorithms are needed to map the original BRDFs to the linear combinations of ink BRDFs such that the relative glossiness between the original BRDFs can be preserved. In this case, the original BRDFs are not treated individually, but are considered together. For example, if a user wanted to print four BRDFs with glossiness at 100%, 80%, 50%, and 10%, and but only two inks are available with glossiness at 10% and 50%, then 50% is the maximum glossiness that can be achieved, while the maximum desired glossiness is 100%. In this case, the original four BRDFs are mapped to have glossiness at 50%, 43%, 27%, and 10% such that the relative glossiness between the original BRDFs can be preserved.

Figure 3A:
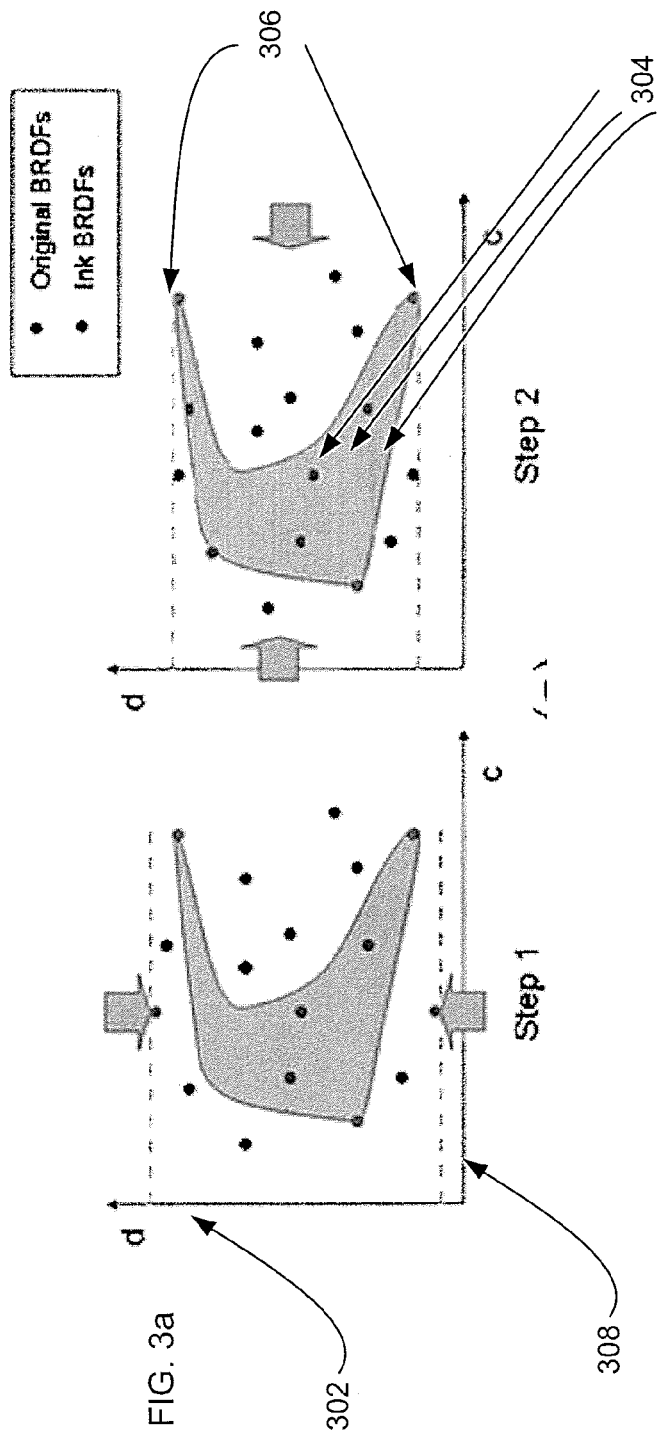
FIGS. 3a and 3b are examples of gamut mapping algorithms.
Figure 3B:
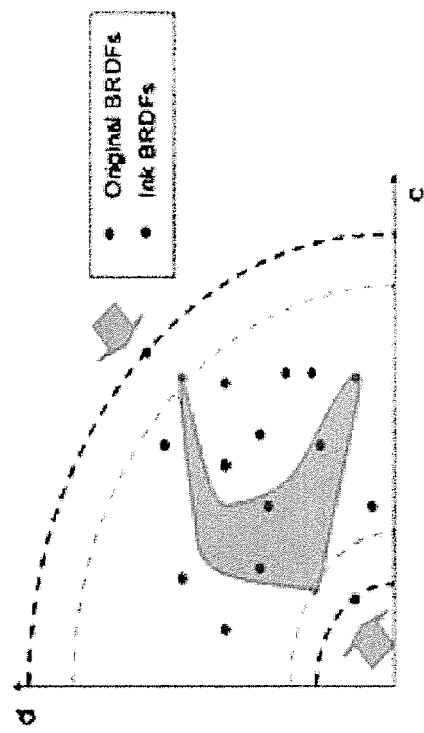

One definition of "glossiness" for a given BRDF is based on developing a perceptually-uniform space for representing the "apparent glossiness" of BRDFs that can be represented as a Ward model. That is, for a given BRDF, it must be made to fit in the Ward model, and then the fitting result must be represented in the perceptually-uniform space. Thus, the BRDF can be represented as two parameters: c and d, in the perceptual space, where c represents the contrast of the highlight and d represents the sharpness of the highlight. The apparent glossiness of the given BRDF can be defined by the equation: $\sqrt{c^2+(1.78d)^2}$ Given the perceptually-based representation of BRDFs, the following two algorithms can be used for performing the gamut mapping, as shown in the example of FIG. 3. These algorithms are examples, and other algorithms could be used to achieve similar results.

The first algorithm (FIG. 3a) has two steps. In the first step, the original BRDFs are compressed along the d axis 302 (e.g., the d values of the original BRDFs are mapped to fit within the range of the d values of all possible linear combination of the ink BRDFs). In the second step, the d axis 302 is then discretized into N bins 304. For each bin 304, maximum and minimum values 306 are computed along the c axis 308 for all possible linear combination of the ink BRDFs. Finally, each of the original BRDFs are mapped along the c axis 308.

In a second algorithm (FIG. 3b), the range of the apparent glossiness for the original BRDFs, and all possible linear combinations for the ink BRDFs are computed. The apparent glossiness is defined as $\sqrt{c^2+(1.78d)^2}$. The original BRDFs are mapped to the points such that the range of the apparent glossiness fits within the range of the linear combination of the ink BRDFs. Each original BRDF maps to a contour which represents a given apparent glossiness value. Finally, for each original BRDF, the closest point on the contour is located.

Figure 4:
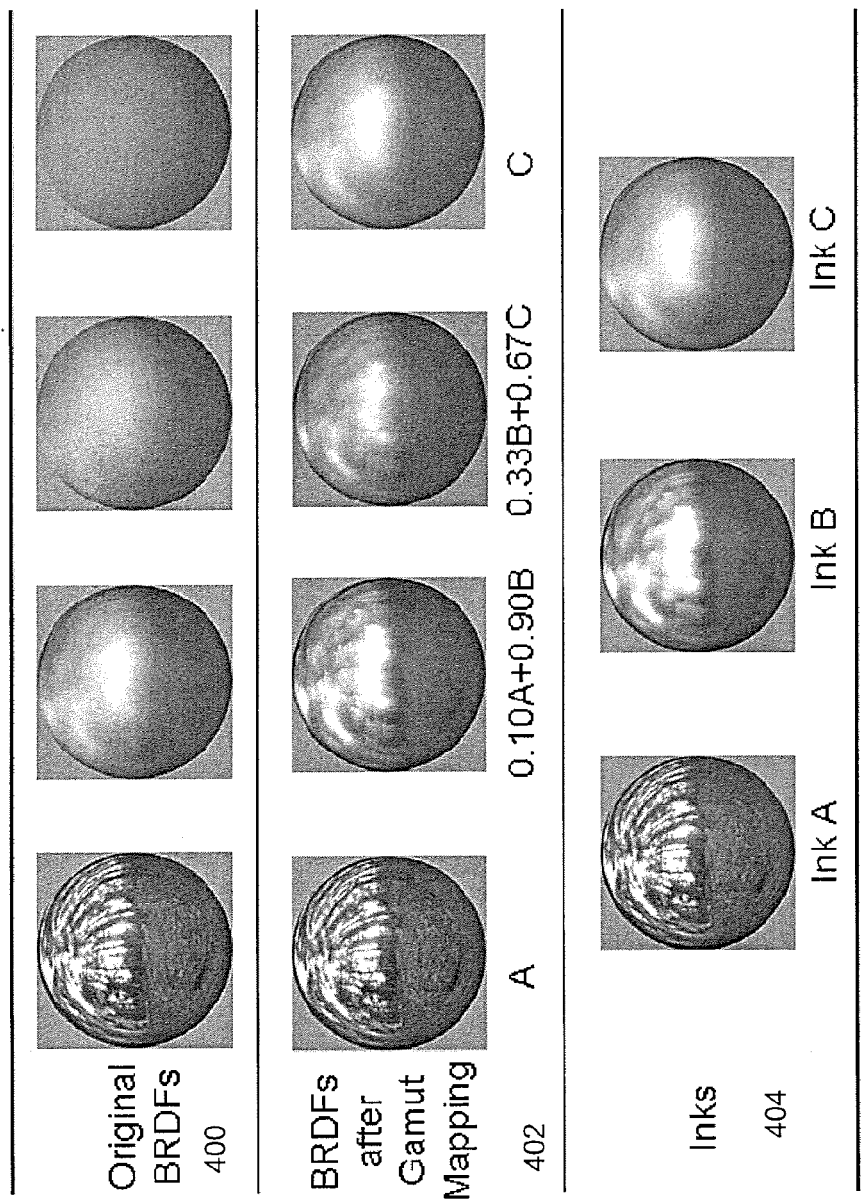

FIG. 4 shows an example of gamut mapping. The first row 400 shows the original four BRDFs. The third row 404 shows the three ink BRDFs, and the second row 402 shows the original BRDFs after gamut mapping, which are linear combinations of the three inks. As shown, the mapped BRDFs preserve the relative glossiness between each other.

Due to the limitations of current printing technologies, most inkjet or offset printers can only print dots with one type of ink at a time. In order to achieve the continuous values for the weights of the linear combinations of the inks computed after the gamut mapping, halftoning algorithms can be used to generate binary patterns to best approximate the weights of the linear combinations.

To print a document of size M×N, each of the cells typically has a different BRDF, represented as some linear combination of the ink BRDFs, computed in the gamut mapping step. The goal is to generate an M×N halftone pattern in which each element is a label from 1 to K, indicating which of the K inks the printer should print on that cell. The halftone pattern will be generated to best approximate the linear combination, as well as to minimize visual artifacts (i.e., high frequency noise).

A number of methodologies and techniques can be used to generate halftone patters. For example, if there are only two inks used, there is one weight $\alpha_1(x, y)$ at each of the M×N cells, since $\alpha_1(x, y)+\alpha_2(x, y)=1$. Standard halftoning algorithms can be used for gray-scale images to generate the halftone pattern from the weight image $\alpha_1(x, y)$, such as ordered-dither and error-diffusion.

In some examples, if there are more than two inks used at each of the M×N cells, there are a vector of weights. The Floyd-Steinberg error diffusion method can be extended for operating on the "vector-version" weight image to generate the halftone pattern. More specifically, the algorithm works as follows: for each of the N×M cells, the closest vector is found among the K vectors consisting of (0, 0, ..., 0), (1, 0, ..., 0), (0, 1, ..., 0), ... (0, 0, ..., 1). The corresponding label is assigned to the cell and the quantization error vector is computed. The quantization error vector is the re-distributed to the neighboring cells according to an error diffusion template, such as the Floyd-Steinberg error diffusion template. The Floyd-Steinberg error diffusion template is as follows:

|      | *    | 7/16 |
| ---- | ---- | ---- |
| 3/16 | 5/16 | 1/16 |

In some examples, for each BRDF (including the original BRDFs and the ink BRDFs), an image is generated of the BRDF rendered under complex natural illumination for all the views. As a result, each of the M×N cells now is represented as a vector of the image. In one example, the standard error diffusion templates (such as Floyd-Steinberg template) and the error diffusion are used to generate the halftone pattern. In another example, the optimal error diffusion template is found by minimizing the following objective function: min $\|I(\omega_i)-G*I_h(\omega_i)\|$. Where $I(\omega_i)$ is the image of the original BRDFs under a particular view, $I_h(\omega_i)$ is the image of the halftoned BRDFs under the same view, and G is a Gaussian filter. Either views that are important to the users or the application, or aggregate the error over all the views can be chosen.

Some examples relate to global optimization of the halftone pattern. This algorithm tries to find the optimal labeling for each of the M×N cells to minimize the above objective function: min $\|I(\omega_j)-G^*I_h(\omega_j)\|$. Since each cell can have K labels, there are $K^{M \times N}$ possible solutions. Simulated annealing can be used as an approximation to solve the exponential problem.

Figure 5:
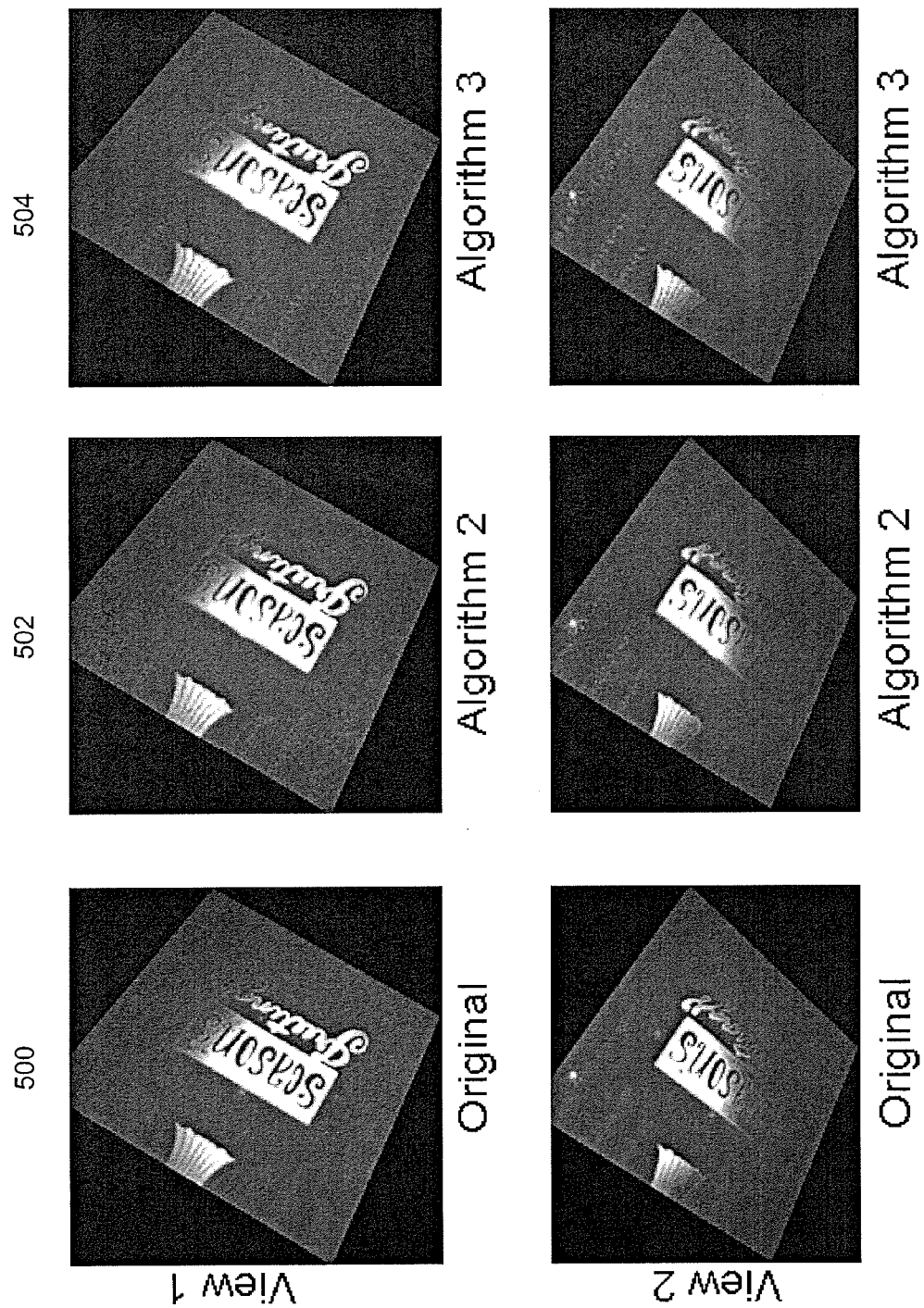
FIG. 5 is an example of halftoning algorithms at two different views.

The quality of the halftone pattern gradually improves, with the price of the running time. In general, the second and third techniques discussed above may achieve a desirable balance between speed and quality in practice. FIG. 5 is an example of halftoning algorithms at two different views. In the example of FIG. 5, the left column 500 shows the original BRDFs, the middle column 502 and the right column 504 show the results of Algorithm 2 and Algorithm 3, respectively.

In some examples, a GUI (graphical user interface) preview tool can show the previewed version of the designed document given the inks available before the actual printing. That is, the preview tool shows the preview version of the original BRDFs based on measured raw ink. BRDFs. This tool can be embedded into software and will allow for documents with material properties. The preview tool has a number features. For instance, the preview utility would allow a user to use measured BRDFs for inks in the shader. This will generate more realistic previews for the desired BRDFs. The utility will also enable users to change the weight map to create interesting, customized linear combinations of the ink BRDFs. Users may also change lighting and views interactively to look at the document at different angles and settings before the actual printing. In addition, the preview tool enables environment lighting, enables bump mapping of the document to simulate the emboss effect, enables, several halftoning algorithms, and uses Frame Buffer Object (FBO) to reduce aliasing for halftone BRDFs.

Figure 6:
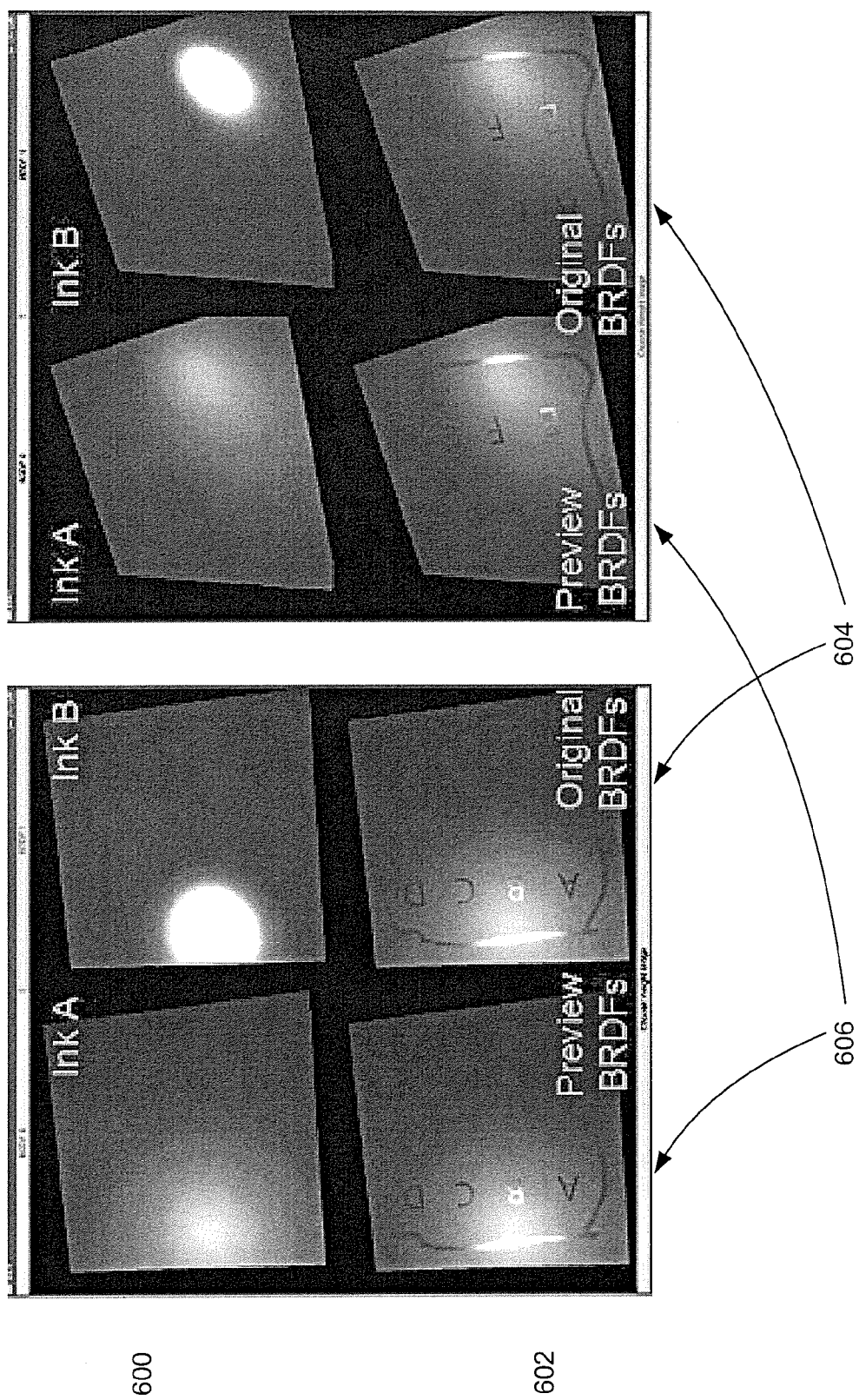
FIG. 6 is a group of screenshots of a preview tool.

Referring to FIG. 6, users can select different BRDFs as the inks, as shown on the top row 600. On the bottom row 602, the right side shows the original BRDFs 604 composed from some weight image, the left side shows the halftone (or "preview") BRDFs 606.

The gamut mapping and halftoning algorithms can also be used to build passive display devices for BRDFs. Passive display devices are displays that will reflect light instead of emitting light, which are also often called "e-paper" or "flexible displays." Current passive display devices can only display gray-scale or color images. The techniques described above regarding printing with BRDFs can be used to create passive display devices for BRDFs.

Figure 7B:
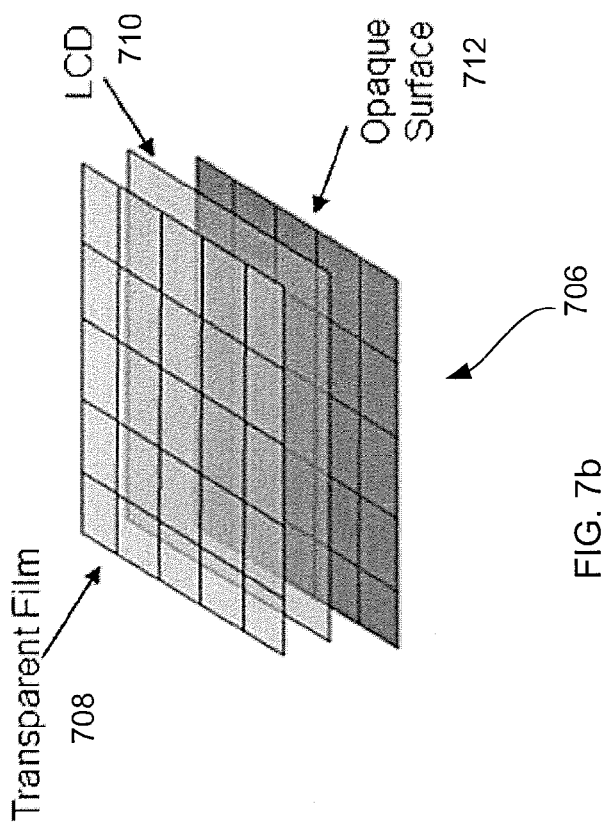
FIGS. 7a and 7b are examples of passive display devices.
Figure 7A:
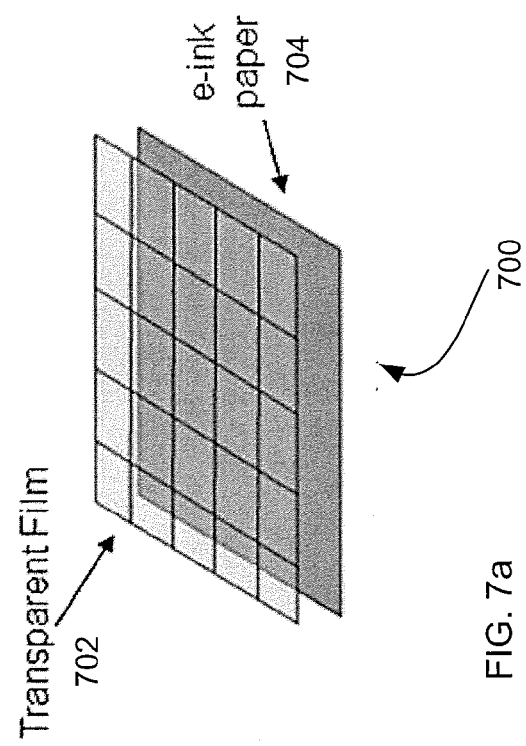
Figure 8:
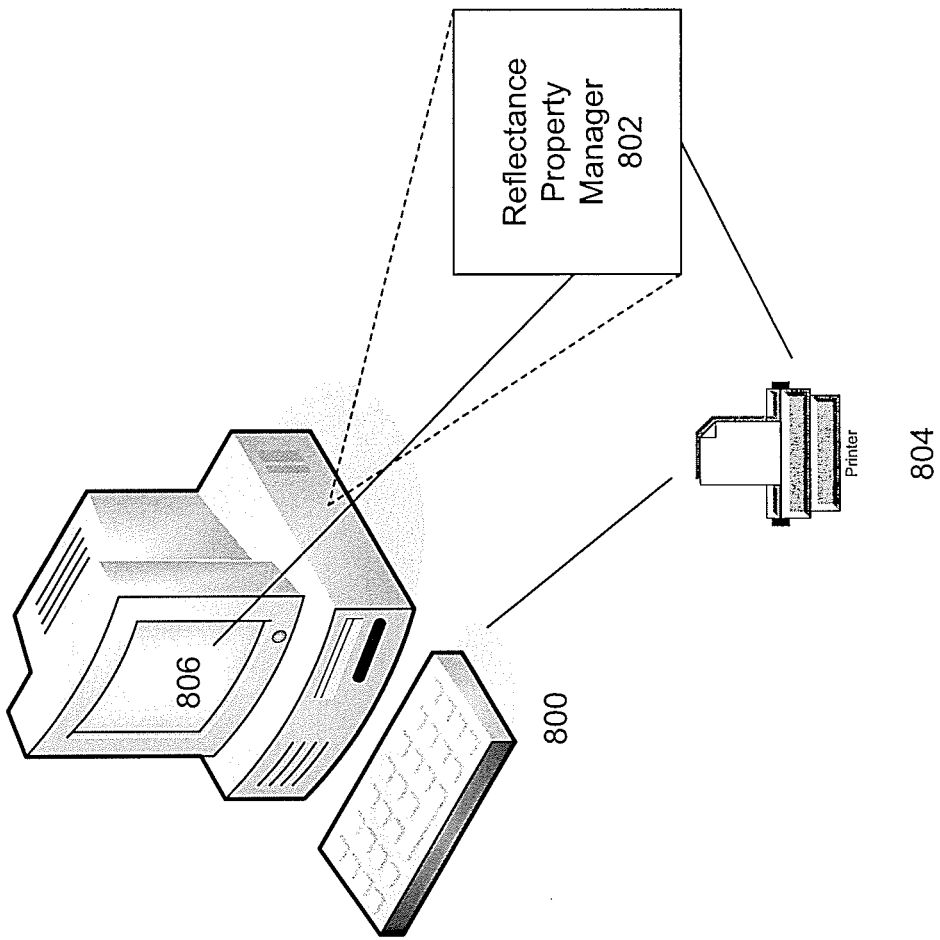
FIG. 8 is an example of a computer using reflectance properties.

For example, as shown in FIG. 7(a), the passive display device 700 includes two layers. The top layer is a translucent film 702 where different cells have different BRDF. Some cells are shiny and glossy, and other cells are diffuse and matte. The bottom layer is a programmable e-paper (or "e-ink") 704. The brightness of each cell of the e-paper can be controlled with a circuit. Varying the voltage applied to each cell will generate different brightness for each cell.

This two-layer design essentially creates a modulator for the BRDFs on the top layer. By controlling the brightness of each cell of the e-paper 704, the weight of the modulation for each cell can be changed on the top layer, and different linear combination of the BRDFs, can be produced. Thus the display's 700 material properties can be altered. For example, if all the e-paper 704 cells below the glossy cells are dark and all the e-paper cells below the diffuse cells are bright, the whole display will look diffuse. Accordingly, the whole display will look glossy if the cells below the glossy cells are light and all the e-paper cells below the diffuse cells are dark.

Referring to FIG. 7(b), device 706 is an example of a three-layer surface. The top layer again can be a translucent film 708 with different BRDFs. The middle layer is an LCD screen 710. The bottom layer is an opaque surface 712 with different BRDFs. The transparency of each cell of the LCD screen 710 can be controlled using circuits. The LCD screen 710 can be used as a modulator for the BRDFs on the bottom layer as well as for the BRDFs on the translucent film 708 on the top.

Some advantages of this design over the first design are: (1) the LCD is easier to obtain and cheaper than e-ink paper; and (2) by controlling the transparency of the LCD layer and having two layers of surfaces with different BRDFs, this design may be able to create BRDFs with more variations.

In an alternative implementation a design can be based on surfaces where the cells of the surface can change their size (stretch or shrink) according to some control signal from a circuit. By changing the size of the cells, different linear combinations can be obtained from the basis BRDFs.

Using reflectance properties in the implementations described above can be carried out on a computer 800 as a set of computer-readable instructions. A reflectance property manager 802 within computer 800 can handle instructions and manage devices that use reflectance properties. Instructions relating to reflectance properties or other data can be communicated to other devices (e.g., printer 804 or display unit 806) via the reflectance property manager 802 or from another device in computer 800. For example, instructions can be sent from reflectance property manager 802 to printer 804 if a user desires to print an image on a document, or the instructions can cause the display unit 806 to generate a preview of that same image. The algorithms described above can be reduced to a computer-readable instruction set, and can cause a cpu to carry out the functions described previously.

Implementations of the subject matter and the functional operations described in this specification can be implemented in digital electronic circuitry, or in computer software, firmware, or hardware, including the structures disclosed in this specification and their structural equivalents, or in combinations of one or more of them. Implementations of the subject matter described in this specification can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

Implementations of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described is this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the invention or of what may be claimed, but rather as descriptions of features specific to particular implementations of the invention. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the invention have been described. Other implementations are within the scope of the following claims. For example, the actions recited in the claims can be performed in a different order and still achieve desirable results.

The invention claimed is:

1. A device-implemented method comprising:
applying at least one medium to a substrate with a device to form a symbol, the device configured as a printing device and perceived reflectance properties of the symbol provided by an amount of the at least one medium applied to the substrate, the perceived reflectance properties being represented by a function that accounts for a lighting direction and a viewing direction of the symbol.

2. The device-implemented method of claim 1, wherein the at least one medium is applied to the substrate in a halftone pattern.

3. The device-implemented method of claim 1, wherein at least two mediums are applied to the substrate, each of the at least tow mediums having different respective reflectance properties.

4. The device-implemented method of claim 3, further comprising linearly combining the at least two mediums having different respective reflectance properties.

5. The device-implemented method of claim 1, wherein the perceived reflectance properties of the symbol are modified based at least in part on reflectance properties of the substrate.

6. The device-implemented method of claim 1, further comprising receiving, from a computing device associated with the device, an optimal linear combination of at least two functions representing reflectance properties of the substrate and the at least one medium.

7. The device-implemented method of claim 6, wherein a relative glossiness of the at least two functions is preserved.

8. The device-implemented method of claim 6, wherein a relative glossiness of the at least two functions is not preserved.

9. The device-implemented method of claim 6, wherein the computing device is further configured to render a preview of the symbol, the preview of the symbol reflecting variable lighting and viewing conditions.

10. The device-implemented method of claim 1, wherein the at least one medium is applied to the substrate in a halftone pattern to approximate a linear combinations of the reflectance properties of the at least one medium with reflectance properties of the substrate.

11. A system comprising:
a printing device configured to apply at least one medium to a substrate to form a symbol, perceived reflectance properties of the symbol are provided by an amount of the at least one medium applied to the substrate, the perceived reflectance properties being represented by a function that accounts for a lighting direction and a viewing direction of the symbol.

12. The system of claim 11, wherein the at least one medium is applied to the substrate in a halftone pattern.

13. The system of claim 11, wherein at least two mediums are applied to the substrate, each of the at least two mediums having different respective reflectance properties.

14. The system of claim 13, further comprising linearly combining the at least wo mediums having different respective reflectance properties.

15. The system of claim 11, wherein the perceived reflectance properties of the symbol are modified based at least in part on reflectance properties of the substrate.

16. The system of claim 11, further comprising a computing device configured to determine an optimal linear combination of at least two functions representing reflectance properties of the substrate and the at least one medium.

17. The system of claim 16, wherein a relative glossiness of the at least two functions is preserved.

18. The system of claim 16, wherein a relative glossiness of the at least two functions is not preserved.

19. The system of claim 16, wherein the computing device is further configured to render a preview of the symbol, the preview of the symbol reflecting variable lighting and viewing conditions.

20. The system of claim 11, wherein the at least one medium is applied to the substrate in a halftone pattern to approximate a linear combination of the reflectance properties of the at least one medium with reflectance properties of the substrate.

21. One or more computer-readable storage devices comprising processor-executable instructions that, responsive to execution by a processor, cause a printing device to:
apply, via a print operation of the printing device, at least one medium to a substrate to form a symbol, perceived reflectance properties of the symbol provided by an amount of the at least one medium applied to the substrate, the perceived reflectance properties being represented by a function that accounts for a lighting direction and a viewing direction of the symbol.

22. The one or more computer-readable storage devices of claim 21, wherein the at least one medium is applied to the substrate in a halftone pattern.

23. The one or more computer-readable storage devices of claim 21, wherein the at least two mediums are applied to the substrate, each of the at least two mediums having different respective reflectance properties.

24. The one or more computer-readable storage devices of claim 23, wherein the processor-executable instructions are further executable by the processor to cause the printing device to linearly combine the at least wo mediums having different respective reflectance properties.

25. The one or more computer-readable storage devices of claim 21, wherein the perceived reflectance properties of the symbol are modified based at least in part on reflectance properties of the substrate.

26. The one or more computer-readable storage devices of claim 21, wherein the processor-executable instruction are further executable by the processor to receive, from a computing device, an optimal linear combination of at least two functions representing reflectance properties of the substrate and the at least one medium.

27. The one or more computer-readable storage devices of claim 26, wherein a relative glossiness of the at least two functions is preserved.

28. The one or more computer-readable storage devices of claim 26, in which a relative glossiness of the at least two functions is not preserved.

29. The one or more computer-readable storage devices of claim 26, in which the computing device is further configured to render a preview of the symbol, the preview of the symbol reflecting variable lighting and viewing conditions.

30. The one or more computer-readable storage devices of claim 21, wherein the at least one medium is applied to the substrate in a halftone pattern to approximate a linear combination of the reflectance properties of the at least one medium with reflectance properties of the substrate.

31. A device-implemented method comprising:
receiving, at a printing device, data describing a symbol; and
applying, via a print operation of the printing device, at least one medium to a substrate to form the symbol, perceived reflectance properties of the symbol are provided by an amount of the at least one medium applied to the substrate, the perceived reflectance properties being represented by a function that accounts for a lighting direction and a viewing direction of the symbol.

* * * * *

UNITED STATES PATENT AND TRADEMARK OFFICE
CERTIFICATE OF CORRECTION

PATENT NO. : 8,508,801 B2  
APPLICATION NO. : 12/323693  
DATED : August 13, 2013  
INVENTOR(S) : Wojciech Matusik et al.

Page 1 of 1

It is certified that error appears in the above-identified patent and that said Letters Patent is hereby corrected as shown below:

In the Claims

Column 10, Line 50, between "least" and "mediums...", delete "tow" and insert -- two --, therefor.

Column 11, Line 7, between "...a linear" and "of the...", delete "combinations" and insert -- combination --, therefor.

Column 12, Line 14, between "...at least" and "mediums...", delete "wo" and insert -- two --, therefor.

Column 12, Line 21, between "...processor-executable" and "are", delete "instruction" and insert -- instructions --, therefor.

Signed and Sealed this  
Twenty-sixth Day of November, 2013

Margaret A. Focarino  
*Commissioner for Patents of the United States Patent and Trademark Office*